United States Patent
Smereka et al.

(10) Patent No.: US 9,544,716 B2
(45) Date of Patent: *Jan. 10, 2017

(54) SYSTEM AND METHOD FOR USING VEHICLE RADIO TO CONTROL DELIVERY OF PREMIUM CONTENT TO A SMARTPHONE

(71) Applicant: MYINE ELECTRONICS, INC., Ferndale, MI (US)

(72) Inventors: Scott W. Smereka, Warren, MI (US); Donald J. Ebben, Novi, MI (US); Jacob R. Sigal, Ferndale, MI (US)

(73) Assignee: Myine Electronics, Inc., Ferndale, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/648,576

(22) PCT Filed: Nov. 21, 2013

(86) PCT No.: PCT/US2013/071220
§ 371 (c)(1),
(2) Date: May 29, 2015

(87) PCT Pub. No.: WO2014/088825
PCT Pub. Date: Jun. 12, 2014

(65) Prior Publication Data
US 2015/0319558 A1 Nov. 5, 2015

Related U.S. Application Data

(60) Provisional application No. 61/732,656, filed on Dec. 3, 2012.

(51) Int. Cl.
*H04W 4/00* (2009.01)
*H04W 12/08* (2009.01)
(Continued)

(52) U.S. Cl.
CPC .............. *H04W 4/008* (2013.01); *H04L 67/10* (2013.01); *H04W 4/003* (2013.01); *H04W 4/046* (2013.01);
(Continued)

(58) Field of Classification Search
None
See application file for complete search history.

(56) References Cited

U.S. PATENT DOCUMENTS 7,257,426 B1 * 8/2007 Witkowski ............. G07C 5/008
455/41.2
2007/0233580 A1 * 10/2007 Pike ................... G06Q 30/0603
705/27.1
(Continued)

OTHER PUBLICATIONS

International Search Report and Written Opinion of the International Searching Authority for PCT/US2013/071220, mailed Feb. 14, 2014; ISA/US.

*Primary Examiner* — Alejandro Rivero
(74) *Attorney, Agent, or Firm* — Stephen T. Olson; Harness, Dickey & Pierce, P.L.C.

(57) ABSTRACT

A system and method for enabling access to premium content, obtained via a smartphone, to be controlled by using a vehicle as a "key" to unlock the premium content. In one implementation the user of the vehicle uses her/his smartphone to establish a wireless link with the vehicle's radio system. The vehicle's radio system supplies a unique radio identifier to the smartphone, which the smartphone forwards to a remote authorization server. The authorization server determines from an internal database if the radio identifier is permitted access to any premium content. If so the authorization server forwards a code or command to the smartphone that the smartphone uses when accessing a web-based or cloud-based content provider, which enables the user to receive premium content form the content provider.

18 Claims, 3 Drawing Sheets

(51) Int. Cl.
  *H04W 76/00*    (2009.01)
  *H04W 48/16*    (2009.01)
  *H04W 4/04*    (2009.01)
  *H04L 29/08*    (2006.01)
  *H04W 88/02*    (2009.01)
  *H04W 88/08*    (2009.01)
  *H04W 88/14*    (2009.01)

(52) U.S. Cl.
  CPC ............. *H04W 12/08* (2013.01); *H04W 48/16* (2013.01); *H04W 76/002* (2013.01); *H04W 88/02* (2013.01); *H04W 88/08* (2013.01); *H04W 88/14* (2013.01)

(56) References Cited

U.S. PATENT DOCUMENTS

| | | |
|---|---|---|
| 2009/0081947 A1 | 3/2009 | Margis |
| 2010/0313132 A1* | 12/2010 | Link, II ................. B60K 35/00 715/727 |
| 2012/0221173 A1* | 8/2012 | Ampunan ............. B60R 16/037 701/2 |
| 2012/0252364 A1 | 10/2012 | Inabathuni et al. |
| 2012/0255036 A1 | 10/2012 | Kidder |
| 2012/0274459 A1* | 11/2012 | Jaisimha ................ H04H 20/31 340/438 |

* cited by examiner

SYSTEM AND METHOD FOR USING VEHICLE RADIO TO CONTROL DELIVERY OF PREMIUM CONTENT TO A SMARTPHONE

CROSS-REFERENCE TO RELATED APPLICATIONS

This application is a U.S. National Phase Application under 35 U.S.C. 371 of International Application No. PCT/US2013/071220 filed on Nov. 21, 2013 and published in English as WO 2014/088825 A1 on Jun. 12, 2014. This application claims the benefit of U.S. Provisional Application No. 61/732,656, filed on Dec. 3, 2012. The entire disclosures of the above applications are incorporated herein by reference.

FIELD

The present disclosure relates to systems and methods for delivering content to an electronic device via a radio system of a vehicle, and more particularly to a system and method for using the radio system of the vehicle as a "key" to help unlock a premium feature of an application running on a user's smartphone.

BACKGROUND

The statements in this section merely provide background information related to the present disclosure and may not constitute prior art.

Present day smartphones are being used with particular applications running thereon to download content for playback while a user is travelling in a motor vehicle. For example, one specific application popular at the present time is PANDORA® Internet Radio (hereinafter simply "Pandora Internet Radio"). Pandora Internet Radio is capable of supplying predetermined music content to the smartphones of users which is tailored to take into account the likes and dislikes of the user. Potentially two types of content may be supplied to the user: 1) content which includes commercials interspersed throughout the delivered content; and 2) commercial free content.

In an application where the user is using her/his smartphone to access the content provider and playback the content on a vehicle radio system, there has been no way to use the vehicle in a manner that enables different types of content delivery (e.g., "premium content" or "standard content) to be delivered by a remote content provider to the user's smartphone. Presently some vehicle manufacturers provide a free period for some type of service (e.g., satellite radio subscription), when a user purchases a vehicle of the manufacturer. But this scenario does not provide any way for the vehicle to be used to selectively "unlock" a premium feature that a given application on the user's smartphone is capable of providing. With this example, the subscription service to the satellite radio content provider will be available to anyone using the vehicle. And there is no easy and convenient way for the vehicle manufacturer to control the delivery of the subscription service after delivering the vehicle to the user.

It is anticipated that it would be highly desirable if different levels of functionality of a service that a smartphone is able to make use of, through an application running on it, could be controllably delivered to the user while the user is travelling in a motor vehicle. This would enable the user to potentially obtain different levels of service (such as a premium service for a given application), depending on what levels of premium service have been designated/authorized by the vehicle manufacturer. It would also enable the vehicle manufacturer to better promote loyalty among its customers by providing a means to more easily provide the vehicle owner with complimentary access to premium content as part of promotions, or for visiting a dealership associated with the vehicle manufacturer. Thus, by using the vehicle as a means to "unlock" one or more different levels of premium content of a service that the vehicle's radio is being used to help provide, this may provide even greater flexibility to the manufacturer in promoting its vehicles.

BRIEF DESCRIPTION OF THE DRAWINGS

The drawings described herein are for illustration purposes only and are not intended to limit the scope of the present disclosure in any way. In the drawings.

SUMMARY

Figure 1:
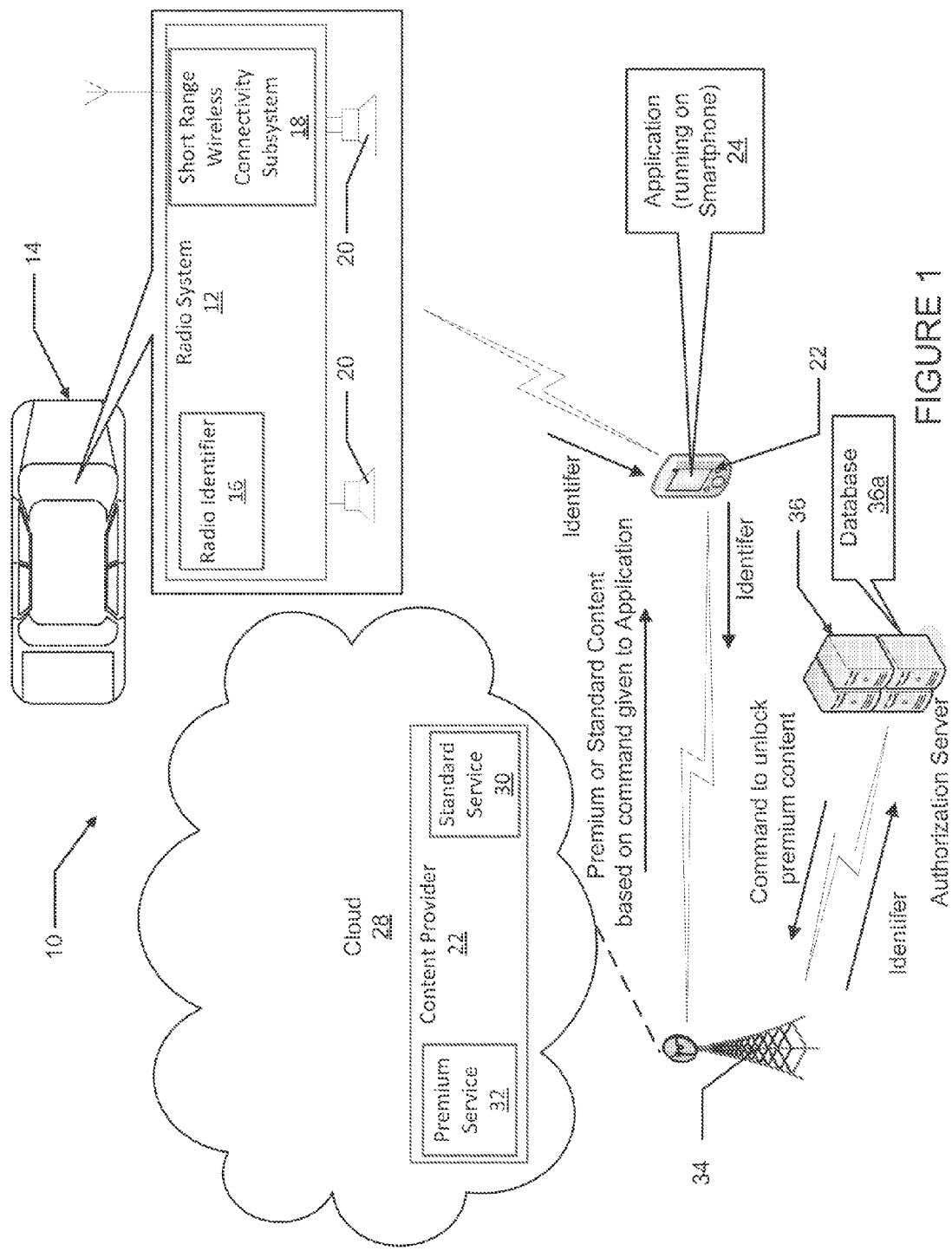
FIG. 1 is a high level block diagram of a system in accordance with one implementation of the present disclosure.

In one aspect the present disclosure relates to a system for controlling access to content available wirelessly from a remote content source and obtained by a smartphone, for subsequent use with a radio system of a vehicle associated with a user. The system may comprise an identifier at least one of stored by, or available to, the radio system of the vehicle, and adapted to be communicated to the smartphone via a first communications link with the smartphone. A remote authorization subsystem may be included which has a database containing a plurality of authorization codes associated with a plurality of vehicles. The remote authorization subsystem may be configured to receive the specific identifier from the smartphone via a second communications link with the database to determine if authorization to use the content source has been granted, and when authorization has been granted, to transmit an authorization code back to the smartphone via the second communications link. The smartphone may include an application for accessing the remote content source and supplying the authorization code to enable access to, and use of, the content source.

In another aspect the present disclosure relates to a system for controlling access to content available wirelessly from a remote content source and obtained by a smartphone, for subsequent use with a radio system of a vehicle associated with a user. The system may comprise an identifier at least one of stored by, or available to, the radio system of the vehicle, and adapted to be communicated to the smartphone via a first communications link with the smartphone. A remote authorization subsystem may be used which includes a server, the serving including a database containing a plurality of authorization codes associated with a plurality of vehicles. A first application may be stored on the smartphone and adapted to manage submitting the identifier to the remote authorization subsystem and receiving a specific authorization code back from the authorization subsystem when the radio system is authorized to obtain content from the content source. A second application may be stored on the smartphone and configured to communicate with the first application for receiving an unlock command from the first application when the specific authorization code is received by the first application. The second application may also be configured to communicate with the remote content source to obtain content from the remote content source.

In still another aspect the present disclosure relates to a method for controlling access to content available wirelessly from a remote content source. The method may comprise providing a vehicle having an electronics subsystem which includes a radio system, and also providing a smartphone. A communications link may be created between the vehicle electronics subsystem the smartphone. The electronics subsystem may be used to provide an identifier to the smartphone via the short range wireless link that identifies the vehicle as being authorized to use content received from the remote content source. The smartphone may be used to access a remote authorization subsystem and to present the identifier to obtain an unlock command from the remote authorization subsystem. The smartphone may also be used to access the remote content source and to present the unlock command to the remote content source, wherein the remote content source supplies the content to the smartphone.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, there is shown a system 10 in accordance with one embodiment of the present disclosure. The system 10 makes use of a radio system 12 of a motor vehicle 14, in this example an automobile. The radio system 12 may include a radio identifier 16, a short range, wireless connectivity subsystem 18, and one or more speakers 20. The radio identifier 16 may be a VIN of the vehicle 14 or any other unique code (numeric or alphanumeric) programmed and stored in an available memory of the radio system 12 or a memory of some other component of the vehicle's electronics system. In either event, the radio identifier 16 is a code that uniquely identifies the vehicle 14. The short range wireless connectivity subsystem 18, in one implementation, involves a Bluetooth® protocol wireless connectivity subsystem. However, any type of short range, wireless connectivity subsystem may potentially be used to form the subsystem 18.

The system 10 may also include a personal electronic device 22 of a user. In one implementation the personal electronic device 22 may be a smartphone. For convenience, the personal electronic device 22 will be referred to throughout the following discussion as "smartphone 22", although it will be appreciated that potentially other types of personal electronic devices such as tablets could potentially be used with the system 10.

The smartphone 22 may have at least one application 24 running thereon for enabling the user to make use of a service, for example a music service, from a remotely located content provider 26. The content provider is shown being based in the cloud 28 and able to provide a "standard" service 30 as well as a premium service 32. In one example the standard service 30 may include commercials or have other features. The premium service 32 may be commercial free or have other features that are highly desirable to users, and for which users would typically be expected to pay an additional fee.

The smartphone 22 may communicate over a typical 3G/4G cellular network with one of a network of antenna towers 34 to enable it to communicate with an authorization server 36. The authorization server 36 may be operated by a third party or it may be connected/operated by the manufacturer of the vehicle 14, or virtually any other entity. The authorization server 36 may include a database 36a of radio identifier numbers that identify which radio identifier is associated with a standard service and which is associated with a premium service for any given application. As one example, consider that the vehicle 14 is made by the ABC Auto company and that the ABC Auto Company has contracted with the XYZ music service to supply music content to the vehicle 14. The radio identifier 16 of the radio system 12 may be stored in the database 36a of the server 36 along with information on which one(s) of one or more premium services offered by the XYZ music service are associated with the radio identifier 16. In this manner the server 36 is able to quickly check and provide authorization back to the radio system 12 for one or more premium services that the user of the vehicle 14 is entitled to make use of. This also enables the vehicle manufacturer to easily instruct that the database 36a be modified so that the premium services that are associated with the vehicle 14 can be modified. For example, the manufacturer may sell the vehicle with a premium service for a given music application which runs for six months from the date of purchase of the vehicle. However, if the vehicle owner returns for an oil change to the dealership that she/he purchased the vehicle at, then the dealership, working either independently or through the vehicle manufacturer, may renew the premium subscription for an additional time period (e.g., 4 months). Alternatively, as another example, consider the situation where a vehicle owner's lease will be up in three months. To encourage the vehicle owner to return to a dealer associated with the manufacturer of the vehicle 14 to look at new models and/or take a test drive in a new vehicle, the manufacturer could offer a premium subscription simply if the vehicle owner visits a dealership of the vehicle manufacturer and/or takes a test drive in a new vehicle. Upon visiting the dealership, the dealership could email the content provider with a promotion code that grants the user access to a premium service for the remaining three months of the lease period. Thus, one can see how various businesses such as vehicle manufacturers and vehicle dealerships could dynamically modify/implement/renew certain premium services to promote customer and brand loyalty. The ability to easily update the database 36a of the server 36 is a significant advantage in that it also lends businesses a great deal of latitude in tailoring specific premium services to users operating different kinds of vehicles. For example, a person purchasing a new vehicle from a luxury vehicle manufacturer could be accorded different premium services than a person purchasing a new vehicle from a manufacturer that is not known as a luxury vehicle manufacturer.

Figure 2:
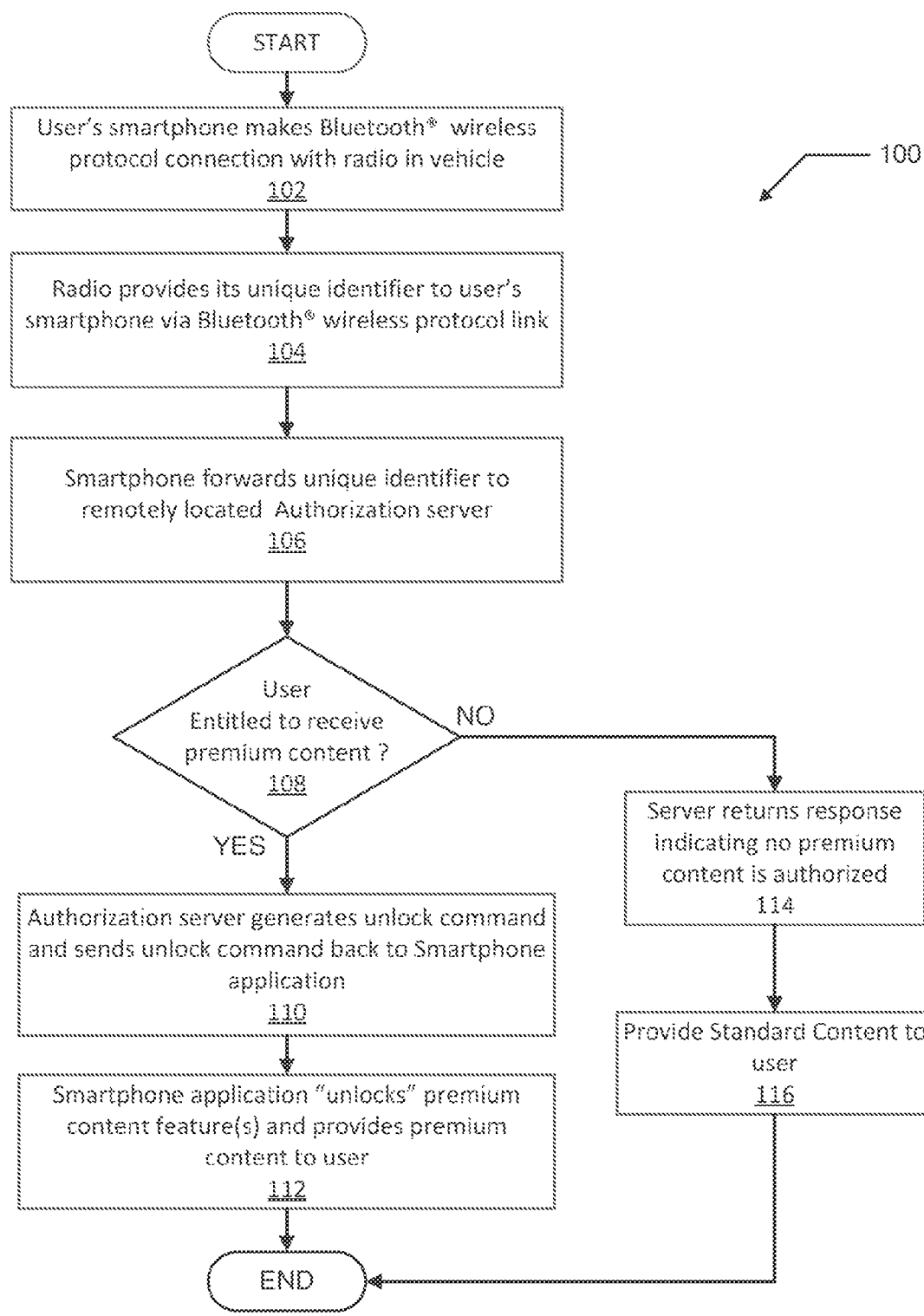
FIG. 2 is a flowchart illustrating one example of operations that may be performed by the system of FIG. 1.

Turning now to FIG. 2, an example of one sequence of operations is provided in flowchart 100. It will be appreciated that the flowchart 100 may be modified to include additional operations or to eliminate certain operations depending on the nature of the specific service(s) that accompany the vehicle 14. At operation 102 the user's smartphone 22 initially makes a short range, wireless connection (i.e., link) with the short range wireless connectivity subsystem 18 when the user first enters the vehicle 14. As explained earlier, one specific manner of forming this wireless link may be by using a Bluetooth® wireless protocol communications subsystem. The radio system 12 then provides its unique identifier 16 to the user's smartphone 22 via the just-initiated short range wireless communications link, as indicated at operation 104.

At operation 106 the smartphone 22 forwards the just-received unique radio identifier 16 to the remote authorization server 36. At operation 108 the authorization server 36 (or other equipment associated with it) determines whether the user is entitled to receive any premium content. If not, then at operation 114 the server 36 returns a response to the smartphone 22 indicating that no premium content has been authorized for the specific radio identifier 16 associated with the vehicle 14. The smartphone 22 will then use the application 24 running on it to obtain the standard content from the content provider 26 and play back the content over the radio system 12 of the vehicle 14, as indicated at operation 116.

If the check at operation 108 indicates that premium content has been authorized for the specific radio identifier 16, then the authorization server 36 generates an "unlock command" and sends the unlock command back to the smartphone 22, as indicated at operation 110. The smartphone 22 uses the unlock command to "unlock" the premium feature(s) that are associated with the radio identifier 16 and then uses the application 24 to provide the premium content to the user, as indicated at operation 112. The premium content may be played back over the radio system 12. In practice, the application 24 may be configured to access one of two or more available URLs, depending upon the unlock command that is received from the authorization server 36. The unlock command itself may be an authorization code that the application may use to sign on to the content provider's 26 site, and the authorization code may inform the content provider 26 exactly which one or more of its premium services the smartphone 22 is authorized to receive.

Figure 3:
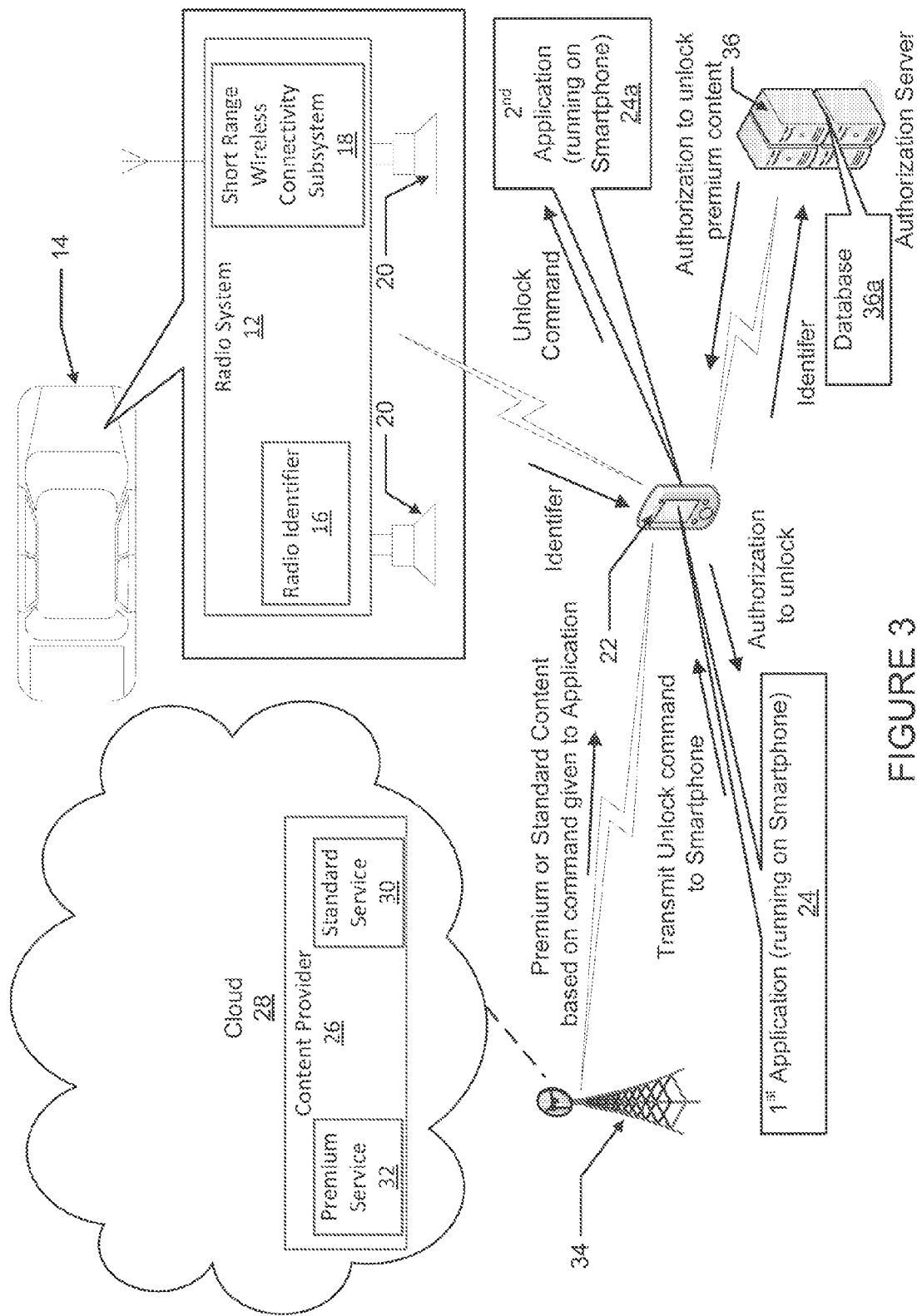
FIG. 3 is a high level block diagram of a system in accordance with another implementation of the present disclosure.

Referring to FIG. 3, a variation of the system 10 is shown which operates identically to the system 10 except for the use of two applications 24 and 24*a* that are running on the user's smartphone 22. In this example the first application 24 is used to receive the radio identifier 16 and to transmit it to the server 36. The first application 24 is also used to receive an "authorization to unlock" signal from the server 36 if one or more premium services are available for use with the vehicle 14. When the first application 24 receives the "authorization to unlock" signal it sends an unlock command to the second application 24*a*, and the second application 24*a* then uses this signal (or information contained therein) when contacting the content provider 26. This configuration may be helpful to reduce complexity if the vehicle 14 comes with premium services from a number of different web-based or cloud-based content providers. The first application 24*a* could be configured to function as an interface to a number of different applications associated with a corresponding different number of content providers. In this manner the application associated with each different content provider may not need to be modified to make the determination if the smartphone is entitled to receive the premium content from its associated provider, which may streamline implementation of the system 10 with various content providers.

The system 10 and methodology of the present disclosure thus enables the vehicle 14 to effectively be used as a "key" to help unlock premium content from one or more content providers. While the present disclosure has been described in connection with a single radio identifier 16, it will be appreciated that two or more unique radio identifiers could also be stored in the radio system 12 or elsewhere in the electronics of the vehicle 14. The two or more unique identifiers could be associated with two or more specific web-based or cloud-based content providers. Accordingly, it will be appreciated that the system 10 and methodology of the present disclosure is not limited to use with only a single radio identifier 16.

The system 10 is expected to significantly enhance the ability of businesses, for example motor vehicle manufacturers, to designate specific types of premium content that can be used with their vehicles, and also to enable changes in the types of premium content available to be made dynamically as needed. And while the foregoing discussion has focused around a motor vehicle such as a car, it will be appreciated that the present disclosure is not limited to use in connection with only motor vehicles such as passenger cars and trucks. It is just as possible that the system 10 and the methodology of the present disclosure could be used in connection with a bus, airline, cruise line, etc., to unlock premium content whenever the user is travelling on a specific airline, cruise line or bus line, and using her/his smartphone to receive content from a remote web-based or cloud-based content provider.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for controlling access to content available wirelessly from a remote content source and obtained by a personal electronic device (PED) of a user, for subsequent use with a radio system of a vehicle associated with the user, the system comprising:
   an identifier at least one of stored by, or available to, the radio system of the vehicle, and adapted to be communicated to the PED via a first communications link with the PED;
   a remote authorization subsystem, remote from the vehicle and the PED, which includes a database containing a plurality of authorization codes associated with a plurality of vehicles;
   the remote authorization subsystem configured to receive the identifier from the PED via a second communications link with the database to determine if authorization to use the content has been granted, and when authorization has been granted, to transmit an authorization code back to the PED via the second communications link; and
   wherein the PED includes an application for accessing the remote content source and supplying the authorization code back to the remote content source to enable access to, and use of, the content, while the PED is being used in the vehicle.

2. The system of claim 1, wherein the remote authorization subsystem comprises a remotely located authorization server.

3. The system of claim 1, wherein the authorization code comprises a command indicating that the vehicle associated with the identifier is authorized to use the content, and wherein the content comprises a premium version of a service otherwise available for use without the authorization code.

4. The system of claim 1, wherein the authorization code comprises a universal remote locator (URL) that the PED uses to access the remote content source.

5. The system of claim 1, wherein the first wireless communications link is a short range, wireless communications link established automatically when the PED is placed in the vehicle while the radio system is operating.

6. The system of claim 1, wherein the content is cloud based content.

7. The system of claim 1, wherein the identifier is modifiable by a manufacturer of the vehicle.

8. A system for controlling access to content available wirelessly from a remote content source and obtained by a personal electronic device (PED) of a user, for subsequent use with a radio system of a vehicle associated with the user, the system comprising:
   an identifier at least one of stored by, or available to, the radio system of the vehicle, and adapted to be communicated to the PED via a first communications link with the PED;
   a remote authorization subsystem including a server, the server including a database containing a plurality of authorization codes associated with a plurality of vehicles;
   a first application stored on the PED adapted to manage submitting the identifier to the remote authorization subsystem and receiving an authorization code back from the remote authorization subsystem when the radio system is authorized to obtain content from the content source;
   a second application stored on the PED configured to:
      communicate with the first application for receiving the authorization code from the first application; and
      to use the authorization code when accessing the remote content source to obtain content from the remote content source while the PED is being operated within the vehicle.

9. The system of claim 8, wherein the authorization code enables the PED to access and sign on to the remote content source.

10. The system of claim 8, wherein the first communications link comprises a short range, wireless communications link established automatically when the PED is placed in the vehicle while the radio system is operating.

11. The system of claim 8, wherein the remote content source is a cloud based content source.

12. The system of claim 8, wherein a manufacturer of the vehicle controls providing the identifier.

13. A method for controlling access to content available wirelessly from a remote content source, the method comprising:
   providing a vehicle having an electronics subsystem which includes a radio system;
   providing a personal electronic device (PED);
   creating a short range wireless link between the vehicle electronics subsystem and the PED;
   using the vehicle electronics subsystem to provide an identifier to the PED via the short range wireless link that identifies the vehicle as being authorized to use content received from the remote content source,
   using the PED to access a remote authorization subsystem and to present the identifier to obtain an unlock command from the remote authorization subsystem; and
   using the PED to present the unlock command to the remote content source when accessing the remote content source, wherein the unlock command enables the PED to receive the content while the PED is being used in the vehicle.

14. The method of claim 13, further comprising using the PED to present the content to the radio system.

15. The method of claim 13, wherein the communications link between the PED and the vehicle electronics subsystem is a short range, wireless communications link.

16. The method of claim 13, further comprising using a first application running on the PED to create the communications link with the remote authorization subsystem, and using a second application running on the PED to establish the wireless communications link with the remote authorization subsystem.

17. The method of claim 13, wherein using the PED to access the remote content source comprises using the PED to access a cloud based remote content provider.

18. The method of claim 13, further comprising using a manufacturer of the vehicle to control providing the identifier to the PED.

* * * * *